United States Patent [19]

Podlas

[11] 3,839,255

[45] Oct. 1, 1974

[54] METHOD OF PREPARING POLYMER GELS USING CHELATED ALUMINUM SALT

[75] Inventor: Thomas J. Podlas, Newark, Del.

[73] Assignee: Hercules Incorporated, Wilmington, Del.

[22] Filed: May 10, 1973

[21] Appl. No.: 359,061

Related U.S. Application Data

[63] Continuation-in-part of Ser. No. 205,712, Dec. 7, 1971, abandoned.

[52] U.S. Cl. .......................................... 260/29.6 M
[51] Int. Cl. ............................................ C08f 37/14
[58] Field of Search .............. 260/29.6 M, 29.6 HN; 252/8.5 LC

[56] References Cited
UNITED STATES PATENTS

| | | | |
|---|---|---|---|
| 3,306,870 | 2/1967 | Eilers | 260/29.6 |
| 3,518,287 | 6/1970 | Rinse | 260/438.5 |
| 3,554,287 | 1/1971 | Eilers | 260/29.6 |

OTHER PUBLICATIONS

Chemical Abstracts — Vol. 71, 1969, page 345, 117029Y.
Chemical Abstracts — Vol. 75, 1971, Page 352, 11017K.
Chemical Abstracts, Vol. 74, Page 278, 462176.

Primary Examiner—William H. Short
Assistant Examiner—Peter F. Kulkosky
Attorney, Agent, or Firm—William S. Alexander

[57] ABSTRACT

A process for gelling a solution of an anionic acrylamide copolymer using a chelated aluminum salt. By proper selection of chelate and adjustment of pH of the solution within a specified range, gelation time can be controlled to any desire point within a range from several minutes to several hours.

6 Claims, No Drawings

METHOD OF PREPARING POLYMER GELS USING CHELATED ALUMINUM SALT

This application is a continuation-in-part of my copending U.S. Pat. application Ser. No. 205,712, filed Dec. 7, 1971 and now abandoned.

The present invention relates to a process of preparing gels based on anionic copolymers of acrylamide. More particularly, it relates to a process of controlling the gelation time of aqueous anionic acrylamide copolymer solutions, the gelation time being controllable throughout a wide range.

It is known to gel anionic acrylamide copolymers by cross-linking them with trivalent cations, e.g., aluminum ions. However, this procedure has several drawbacks. Normally, in carrying out this method, an aqueous slurry of a slowly soluble salt of aluminum (generally basic aluminum acetate) is added to a water solution of the polymer. As the aluminum salt dissolves, aluminum ions are slowly made available to cross-link the polymer, causing gelation. One drawback to this prior art method is that the rate of dissolution of the aluminum salt is a very critical factor which varies unpredictably with its age, particle size, and method of manufacture. Too rapid dissolution of the aluminum salt causes precipitation of the aluminum salt of the polymer, and too slow dissolution either makes gelation time so long as to be unacceptable or prevents gelation entirely. A further related drawback is that prior art slurries in which the aluminum salt is sufficiently soluble to be of practical use must be used immediately after preparation, otherwise the aluminum ion concentration will be too high and will cause precipitation of the aluminum salt of the polymer.

The present invention provides for gelling aqueous systems containing anionic acrylamide copolymers and controlling the gelation time throughout a wide range. This gives ample time before gelation for incorporating other ingredients for handling and packaging or for other manipulations while enabling gelling to be completed within a practical period of time. This gelation process comprises:

A. mixing the following ingredients:
1. a first water solution comprising about 0.1 to 5 percent by weight, based on the total weight of solution of a water-soluble aluminum salt, an aluminum chelant, present in an amount such that the chelant/aluminum mole ratio is about 0.2 to 2, and a base in an amount sufficient to adjust the pH of said first solution to about 4 to 9; and
2. a second water solution comprising about 0.1 to 2.5 percent by weight, based on the total weight of said solution, of a water-soluble copolymer of acrylamide and acrylic acid or a metal salt of acrylic acid;

the relative proportions of solutions 1) and 2) being sufficient to provide in the mixture thereof a molar ratio of aluminum atoms to carboxyl groups in the copolymer of about 0.018 to 90 and a copolymer content of about 0.09 to 2.3 percent by weight of the total water present; and B. adjusting the pH of the total mixture to about 4.6 to 8.3.

Step B can optionally be accomplished by adding acid or base to the second water solution in an amount to adjust the pH thereof to about 2 to 9. Additional ingredients (which can be soluble or insoluble in the mixture) can be incorporated into the mixture such as, e.g., fillers or colorants.

Specific embodiments of the invention are shown in the following examples. Parts and percentages are by weight unless otherwise indicated. The examples are intended only to illustrate the invention, but not to limit it.

The following general procedure was employed in each of the examples.

A. To prepare Chelated Aluminum Salt Solution

The aluminum salt was dissolved in water, following which the chelant was also dissolved to form a homogeneous solution. The amounts of aluminum salt, chelant, and water were selected to provide approximately the desired aluminum concentration and chelant-/aluminum mole ratio. The pH of the resulting solution was then adjusted to the desired level by adding an appropriate amount of 20 percent sodium hydroxide solution.

B. To prepare Copolymer Solution

Ten (10) grams of copolymer was added to 990 grams of water and agitated until thoroughly and homogeneously dissolved. If necessary, pH was adjusted by adding 1.5 percent hydrochloric acid or 10 percent sodium hydroxide solution. This solution was employed directly and as a stock solution for further dilution when solutions of less than 1 percent concentration were called for. When greater than 1 percent solutions were desired, the amount of copolymer was increased accordingly.

C. To prepare Gels

An appropriate amount of solution A was added to solution B and agitated to effect homogeneous mixing. Agitation was stopped and the mixture allowed to sit until gelation was complete.

Examples 1 to 26

Using the procedure described above, a number of 1 percent solutions of various acrylamide--sodium acrylate copolymers were prepared and gelled at room temperature using aluminum sulfate as a cross-linker and citric acid as the chelant. Gelling was effected at different pH levels and at different levels of citrate to aluminum, to demonstrate the degree of control which can be exerted over gelation time. Pertinent data are recorded in Table I.

Table I

| Ex. No. | Polymer Type[1] | pH | Cross-Link Solution Citrate/Al | pH | % Al | Al/COOH | Gel Characteristics Gel Time | Type of Gel | pH |
|---|---|---|---|---|---|---|---|---|---|
| 1 | A | 6.0 | 0.35 | 7.0 | 0.26 | 0.9 | 30 sec. | FIRM | 6.5 |
| 2 | A | do. | 0.40 | do. | do. | do. | 4 min. | FIRM | 6.6 |
| 3 | A | do. | 0.45 | do. | do. | do. | 13 min. | FIRM | 6.6 |
| 4 | A | do. | 0.50 | do. | do. | do. | 3.5 hrs. | SOFT-FIRM | 6.6 |
| 5 | A | 7.0 | 0.35 | do. | do. | do. | 1.5 hrs. | SOFT | 7.2 |
| 6 | A | do. | 0.40 | do. | do. | do. | 2 days | SOFT | 7.2 |

Table I – Continued

| Ex. No. | Polymer Type[1] | Polymer pH | Cross-Link Solution Citrate/Al | Cross-Link Solution pH | Cross-Link Solution % Al | Cross-Link Solution Al/COOH | Gel Characteristics Gel Time | Gel Characteristics Type of Gel | Gel Characteristics pH |
|---|---|---|---|---|---|---|---|---|---|
| 7 | A | 7.0 | 0.45 | 7.0 | 0.26 | 0.9 | 3 days | V. SOFT | 7.2 |
| 8 | A | 5.0 | 0.5 | do. | do. | do. | 1 min. | SOFT | 5.9 |
| 9 | A | 6.0 | do. | do. | do. | do. | 3.5 hrs. | SOFT-FIRM | 6.7 |
| 10 | A | 6.6 | do. | do. | do. | do. | 18 hrs. | V. SOFT | 6.9 |
| 11 | B | 3.9 | do. | 6.0 | do. | 4.7 | 1 min. | FIRM | 4.9 |
| 12 | B | 4.5 | do. | do. | do. | do. | 3 min. | FIRM | 5.0 |
| 13 | B | 5.1 | do. | do. | do. | do. | 30 min. | SOFT | 5.5 |
| 14 | B | 6.0 | do. | do. | do. | do. | 12 hrs. | SOFT | 5.9 |
| 15 | B | 3.9 | 0.30 | 7.0 | do. | do. | ~15 sec. | FIRM | 4.7 |
| 16 | B | do. | 0.40 | do. | do. | do. | 3 min. | FIRM | 5.1 |
| 17 | B | do. | 0.50 | do. | do. | do. | 7 min. | SOFT | 5.5 |
| 18 | B | do. | 0.55 | do. | do. | do. | 11 min. | SOFT | 5.5 |
| 19 | C | 6.0 | 0.40 | do. | do. | 0.3 | ~15 sec. | FIRM | 6.5 |
| 20 | C | do. | 0.50 | do. | do. | do. | 3 min. | FIRM | 6.6 |
| 21 | C | do. | 0.55 | do. | do. | do. | 10 min. | SOFT | 6.5 |
| 22 | C | do. | 0.60 | do. | do. | do. | 1.5 hrs. | SOFT | 6.6 |
| 23 | C | 5.0 | 0.50 | do. | do. | do. | ~15 sec. | FIRM | 5.3 |
| 24 | C | 5.8 | do. | do. | do. | do. | 3 min. | FIRM | 6.6 |
| 25 | C | 7.1 | do. | do. | do. | do. | 13 min. | SOFT | 7.1 |
| 26 | C | 7.5 | do. | do. | do. | do. | 1 hr. | SOFT | 7.3 |

[1] Copolymer Type A = 90% acrylamide – 10% sodium acrylate
Copolymer Type B = 98% acrylamide – 2% sodium acrylate
Copolymer Type C = 70% acrylamide – 30% sodium acrylate

Examples 27 to 41

These examples record a series of experiments in which various parameters affecting gelation rate were varied in a random fashion to demonstrate that a wide range of process conditions can be employed and a wide range of gelation times can result. In different examples, one or more of the following parameters were varied from those employed in the examples recorded in Table I:

a. the copolymer
b. the chelant
c. pH level
d. chelant/aluminum ratio
e. aluminum source
f. al/carboxyl mole ratio
g. temperature of gelling.

Pertinent data are recorded in Table II.

employed as the comonomer. Especially preferred as the comonomer is sodium acrylate.

The copolymers to which this invention is applicable also include those prepared by the partial hydrolysis of acrylamide homopolymer. The partial hydrolysis can be accomplished by either acid or base and converts a portion of the amide groups on the polymer chain to carboxyl groups. These products have the same empirical structure as the copolymer. The properties of polymers prepared by the hydrolysis are similar to copolymerization products having equivalent acrylate functionality.

While the process of the present invention for gelling comprises mixing an aqueous solution of soluble aluminum salts with an aqueous solution of the acrylamide copolymer, two important and critical conditions must be met prior to mixing. Not only must the aluminum

TABLE II

| Example number | Polymer Type[1] | Polymer Percent | Polymer pH | Cross-linking solution Chelant | Cross-linking solution Chelant/Al (mole) | Cross-linking solution Al source | Cross-linking solution Percent Al | Cross-linking solution pH | Gel characteristics Al/carboxyl (mole) | Gel characteristics pH | Gel characteristics Temp. of prep. (°C.) | Gel characteristics Time to gel | Gel characteristics Type of gel |
|---|---|---|---|---|---|---|---|---|---|---|---|---|---|
| 27 | D | 1 | 9.0 | Malate | 0.8 | Al₂(SO₄)₃ | 0.26 | 9.0 | 0.045 | 8.1 | 25 | 30 sec. | Firm. |
| 28 | D | 1 | 9.0 | do. | 0.8 | Al₂(SO₄)₃ | 0.26 | 9.0 | 0.018 | 8.3 | 25 | 3 min. | Soft. |
| 29 | C | 1 | 8.9 | Citrate | 0.5 | Al₂(SO₄)₃ | 0.26 | 5.5 | 0.3 | 6.6 | 25 | 1 hr. | V. soft. |
| 30 | A | 1 | 8.4 | do. | 0.25 | Al₂(SO₄)₃ | 0.26 | 6.9 | 0.9 | 7.2 | 25 | 3 days | Do. |
| 31 | A | 1 | 8.4 | Oxalate | 2.0 | Al₂(SO₄)₃ | 0.26 | 5.6 | 0.9 | 7.0 | 25 | 15 min. | Do. |
| 32 | A | 1 | 8.4 | Citrate | 0.2 | Al₂(SO₄)₃ | 0.26 | 5.0 | 0.9 | 6.6 | 25 | Overnight | Do. |
| 33 | A | 1 | 5.5 | do. | 0.5 | Al(NO₃)₃ | 0.26 | 6.0 | 0.9 | 6.5 | 25 | 3 min. | Soft. |
| 34 | A | 1 | 5.5 | do. | 0.5 | AlCl₃ | 0.26 | 7.0 | 1.1 | 6.7 | 25 | 2–3 min. | Do. |
| 35 | B | [2] 0.5 | 2.6 | do. | 0.3 | Al₂(SO₄)₃ | 0.26 | 7.1 | 9.0 | 5.4 | 25 | 5 min. | V. soft. |
| 36 | B | [3] 0.1 | 2.7 | do. | 0.3 | Al₂(SO₄)₃ | 0.26 | 7.1 | 45 | 5.3 | 25 | 35 min. | Do. |
| 37 | B | 0.25 | 2.6 | do. | 0.3 | Al₂(SO₄)₃ | 0.26 | 7.1 | 18 | 4.7 | 25 | 8 min. | Do. |
| 38 | E | 2.5 | 8.2 | do. | 0.3 | Al₂(SO₄)₃ | 0.26 | 4.0 | 3.6 | 4.2 | 25 | 20 min. | Soft. |
| 39 | E | [4] 0.1 | 2.1 | do. | 0.3 | Al₂(SO₄)₃ | 0.26 | 7.0 | 90 | 4.6 | 25 | 15 min. | V. soft. |
| 40 | E | 0.1 | 2.8 | do. | 0.3 | Al₂(SO₄)₃ | 0.26 | 7.0 | 90 | 4.6 | 25 | 20 min. | Pourable. |
| 41 | B | 1 | 3.3 | do. | 0.3 | Al₂(SO₄)₃ | 0.26 | 7.1 | 4.5 | 5.0 | 100 | 2–3 min. | Firm. |

[1] Copolymer Type A=90% acrylamide–10% sodium acrylate; Copolymer Type B=98% acrylamide–2% sodium acrylate; Copolymer Type C=70% acrylamide–30% sodium acrylate; Copolymer Type D=50% acrylamide–50% sodium acrylate; Copolymer Type E=99% acrylamide–1% sodium acrylate.
[2] Solvent: 25% NH₄NO₃–NaNO₃.
[3] Solvent: 45% NH₄NO₃–NaNO₃.
[4] Solvent: 48% NH₄NO₃–NaNO₃.

The process of the invention is applicable to substantially any copolymer of acrylamide and acrylic acid. Typical copolymers are those having about 1 to 60 percent acrylate, preferably about 1 to 50 percent. These copolymers are known products of commerce, being prepared by suspension polymerization techniques employing conventional vinyl polymerization catalysts. In addition to acrylic acid, metal acrylates, especially alkali metal acrylates, can be and, in fact, usually are, salt be partially chelated (complexed) before mixing with the copolymer, but also the pH of the partially chelated aluminum salt solution must be raised to about 4 to 9. Prior to adjustment, the pH of the partially chelated aluminum salt solution is about 2 to 3 and if mixed with the polymer at this pH, cross-linking takes place far too rapidly, leaving no time for any manipulations. However, when the soluble aluminum salt is partially chelated and its pH adjusted according to the present invention, the rate of gelation can be controlled to any desired time throughout a wide range. After the partially chelated aluminum salt solution of pH 4 to 9 is mixed with the acrylamide copolymer, the pH of the final mixture must be in the range of about 4.6 to 8.3. This can be effected by adding a base or acid to the polymer solution or by similar treatment of the final mixture. The base or acid used is not critical and includes, e.g., sodium hydroxide, potassium hydroxide, sodium carbonate, hydrochloric acid, or acetic acid.

In addition to pH, gelation time is also variable, depending on the chelate employed, chelate/aluminum molar ratio, relative volumes of chelated aluminum salt solution and copolymer solution, type of copolymer, copolymer concentration, aluminum ion concentration, and gelation temperature. Usually the gelation temperature will be about 25°C. to 100°C. However, as the artisan will appreciate, temperatures outside this range can be used in some cases. As would be expected, gelation occurs more rapidly at elevated temperatures.

Chelants applicable include the following acids and also their sodium, potassium and other water-soluble salts. Alpha-hydroxy mono- and dicarboxylic acids of 3-4 carbon atoms, e.g., malic, lactic and tartaric, beta-hydroxy tricarboxylic acids, e.g., citric, and dicarboxylic acids of 2-4 carbon atoms, e.g., oxalic, malonic and maleic. The preferred chelants are citric, malic, and oxalic acids and their salts.

Applicable chelant/aluminum molar ratio range is about 0.2 to 2, preferably about 0.3 to 0.8. The particular ratio used depends on the chelant used so long as the amount of chelant is sufficient to prevent any substantial precipitation of aluminum at the pH to which the aluminum salt solution is finally adjusted.

Any water-soluble aluminum salt can be used, including, e.g., aluminum sulfate, potassium or ammonium alum, aluminum nitrate and aluminum chloride.

The concentration of chelated aluminum salt solution is not critical and usually will be about 0.1 percent-5 percent, preferably 0.2-0.5 percent aluminum content by weight of said solution. It has been pointed out hereinbefore that the pH of the aluminum salt solution prior to mixing with the copolymer solution is critical and must be about 4 to 9. The pH of this solution as prepared is normally about 2 to 3 and thus can be adjusted to the proper level by adding a base. Any base is suitable, e.g., sodium hydroxide, potassium hydroxide, sodium carbonate. Sodium hydroxide is preferred.

The relative proportions of the chelated aluminum salt solution and the copolymer solution must be such as to provide in the final mixture thereof a molar ratio of aluminum atoms to anionic functional groups, i.e., carboxyl groups, in the copolymer of about 0.018 to 90, and a copolymer content of about 0.09 to 2.3 percent by weight of the total water present.

The advantages of preparing gels according to this invention are many. The delay of gelation for various periods of time (e.g., about 30 seconds to several days after mixing the gel ingredients) allows for ample manipulation time. The solutions can be transferred to individual containers before the onset of gelation, or can be transported as liquids to other locations if desired. Other insoluble ingredients can be added prior to onset of thickening and thus it is not necessary to subject the additive or the gel to shear during mixing. The choice of sources of aluminum ions is largely expanded over previous methods. It is no longer necessary to add the soluble aluminum salts very slowly as was previously necessary. The consistencies of the gels can be varied easily. In order to obtain a firm or rigid gel, it is no longer necessary to add prohibitively large amounts of aluminum salt. The gels are clear and non-grainy, two qualities frequently lacking when the prior art, slowly soluble, aluminum salts are used. There is no longer the need to be concerned about the age, particle size or solubility of the aluminum salt, or the age of the aluminum salt solution.

The gels prepared by the method of this invention are useful in most of the areas where gels of anionic polymers of this type have previously been employed. For example, they find considerable utility in oil well flooding and fracturing operations where it is helpful to be able to charge a pourable, relatively free flowing liquid into a well and have it subsequently set up to a more rigid state. They can be used in soil stabilization wherein a latent gel is poured or sprayed onto the soil and thereafter allowed to set. Another utility is in slurry explosives which are poured into a borehole and allowed to gel prior to being exploded.

As many apparent and widely different embodiments of this invention may be made without departing from the spirit and scope thereof, it is to be understood that the invention is limited only as defined in the appended claims.

What I claim and desire to protect by Letters Patent is:

1. A process for preparing a polymer gel which comprises:
    A. mixing the following ingredients:
        1. a first water solution comprising about 0.1 to 5 percent by weight, based on the total weight of solution of a water soluble aluminum salt, an aluminum chelant selected from the group consisting of
            a. alpha-hydroxy monocarboxylic acids having 3 to 4 carbon atoms,
            b. alpha-hydroxy dicarboxylic acids having 3 to 4 carbon atoms,
            c. beta-hydroxy tricarboxylic acids, and
            d. dicarboxylic acids of 2 to 4 carbon atoms, said chelant being present in an amount such that the chelant/aluminum molar ratio is about 0.2 to 2 and a base in an amount sufficient to adjust the pH of said first solution to about 4 to 9; and
        2. a second water solution comprising about 0.1 to 2.5 percent by weight, based on the total weight of said solution, of a water soluble copolymer of acrylamide and acrylic acid or a metal salt of acrylic acid;
    the relative proportions of solutions 1) and 2) being sufficient to provide in the mixture thereof a molar ratio of aluminum atoms to carboxyl groups in the copolymer of about 0.018 to 90 and a copolymer content of about 0.09 to 2.3 percent by weight of the total water present; and
    B. adjusting the pH of the total mixture to about 4.6 to 8.3.

2. The process of claim 1 wherein step B. is accomplished by adjusting the pH of the copolymer solution to about 2 to 9 prior to mixing solutions (1) and (2).

3. The process of claim 1 where the aluminum salt is aluminum sulfate and the chelate is citric acid.

4. The process of claim 1 where the copolymer is a copolymer of 50 to 99 percent acrylamide and 50 to 1 percent by weight of a comonomer selected from the class consisting of acrylic acid and water soluble metal salts of acrylic acid.

5. The process of claim 4 where the comonomer is sodium acrylate.

6. The process of claim 5 where the aluminum salt is aluminum sulfate and the chelant is citric acid.

* * * * *